UNITED STATES PATENT OFFICE.

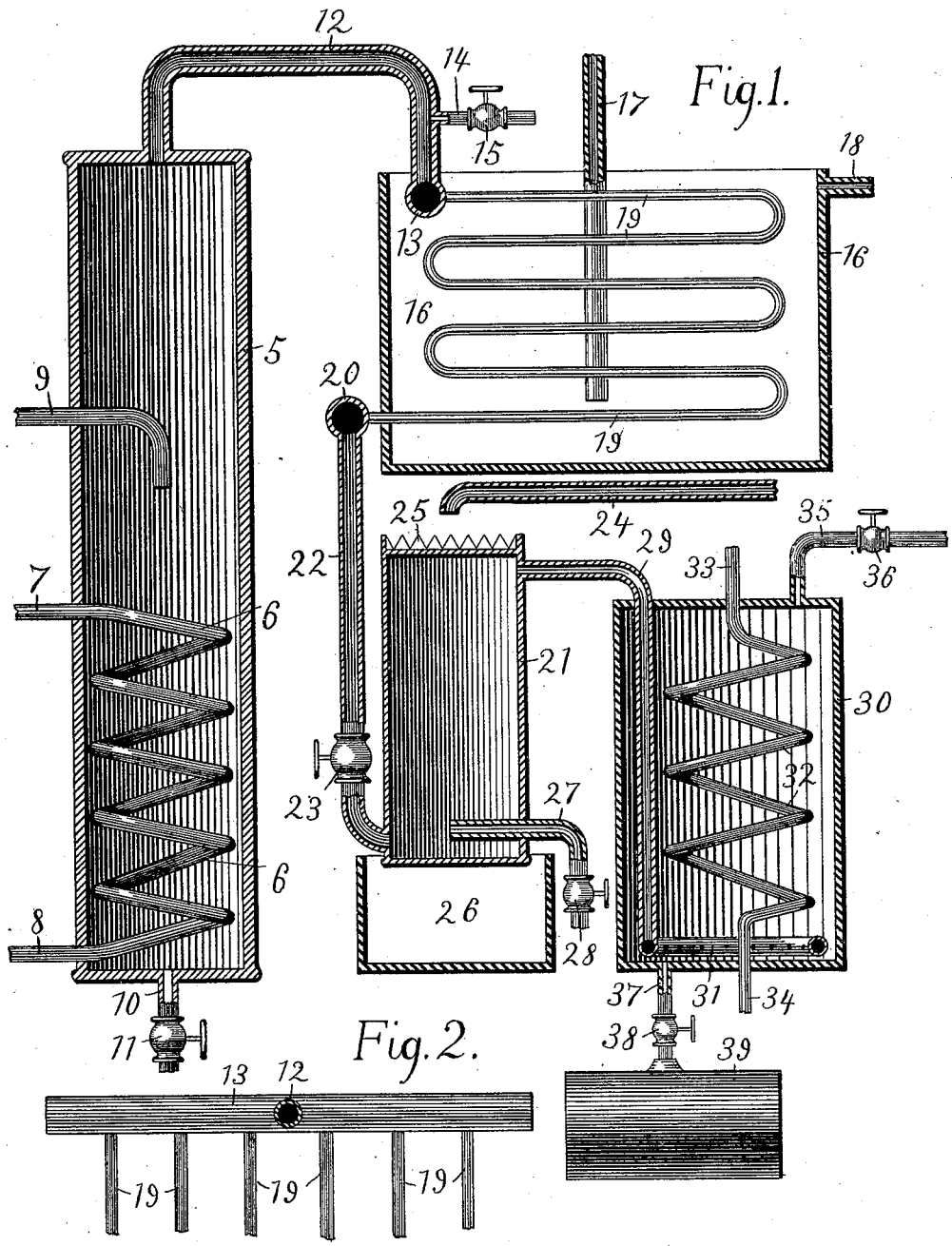

FREDERICK W. A. FRERICHS, OF ST. LOUIS, MISSOURI.

PROCESS OF PURIFYING AMMONIA.

SPECIFICATION forming part of Letters Patent No. 586,950, dated July 20, 1897.

Application filed August 15, 1896. Serial No. 602,851. (No specimens.)

*To all whom it may concern:*

Be it known that I, FREDERICK W. A. FRERICHS, a citizen of the United States, residing at the city of St. Louis, in the State of Missouri, have invented a certain new and useful Process of Purifying Ammonia, of which the following is such a full, clear, and exact description as will enable any one skilled in the art to which it appertains to make and use the same, reference being had to the accompanying drawings, forming part of this specification.

Ammonia purified by the best known processes, although of a high grade of purity, still contains certain impurities which greatly detract from its value when used in ice-machines, because some of them form permanent gases and others clog the nipples of the expansion-valves. Because of this it has come to be generally believed that these impurities were caused by the decomposition of the ammonia in the machine. I have found by experiment, however, that this is not the case.

The object of my invention is to free ammonia from the above-mentioned impurities, so that when used in ice-machines no appreciable amount of fixed gases will be formed and the nipples of the expansion-valves will not become clogged.

My invention consists in the various steps set forth in the following specification and pointed out in the claims affixed hereto.

In the accompanying drawings, which illustrate one form of apparatus by means of which my process may be carried on, Figure 1 is a vertical section, and Fig. 2 is a top plan view of a detail.

Like marks of reference refer to similar parts in both views of the drawings.

5 is a strong iron retort, in which is placed a steam-coil 6, having suitable inlet and outlet pipes 7 and 8, respectively. Leading into the retort 5 is an inlet-pipe 9, through which water of ammonia to be purified enters the retort. At the lower part of the retort 5 is an outlet-pipe 10, provided with a valve 11, through which the liquid in the retort may be drawn off. Leading from the upper part of the retort 5 is an outlet-pipe 12, which terminates in a manifold 13. (Shown in detail in Fig. 2.) Leading from the pipe 12 near the manifold 13 is a pipe 14, provided with a valve 15, which I term a "purge-valve." The manifold 13 projects into a cooling-tank 16, provided with an inlet-pipe 17 and an overflow-pipe 18. Leading from the manifold 13 are a number of pipes 19, which are bent or folded back and forth across the cooling-tank 16, so as to present a large amount of surface to the water contained in the said tank.

The ends of the pipes 19 extend through the sides of the tank 16 and lead into a manifold 20, similar to the manifold 13. Leading from the manifold 20 to a retort 21 is a pipe 22, provided with a valve 23. Above the retort 21 and discharging upon the top of the same is a water-pipe 24. Around the top of the retort 21 is a serrated flange 25, which divides the water into small streams and distributes it evenly around the periphery of the retort. Below the retort 21 is a drip-tank 26, into which the water flows. Leading from the retort 21 is a waste-pipe 27, provided with a valve 28, and a discharge-pipe 29, which passes into a tank 30. To the end of the pipe 29 is secured a perforated ring of pipe 31. In the tank 30 is a cooling-coil 32, provided with inlet and outlet pipes 33 and 34, respectively. Leading into the tank 30 is a water-inlet pipe 35, provided with a valve 36, and leading from the said tank is an outlet-pipe 37, provided with a valve 38, through which the purified water of ammonia can be discharged into a shipping-drum 39 or other suitable receptacle.

The method of carrying on my process is as follows: Strong water of ammonia, preferably made from sulfate of ammonium, is forced under heavy pressure through the pipe 9 into the retort 5, and at the same time steam is admitted through the coil 6 to raise the contents of the retort to a very high temperature, at least 180° centigrade, and preferably higher. The high temperature in the retort 5 breaks up the strong water of ammonia into ammonia-gas and weak water of ammonia and at the same time sets free permanent gases from the impurities. These permanent gases consist of carbon compounds and principally of inflammable hydrocarbon gases. These permanent gases, together with the ammonia-gas, pass off through the pipe 12, while the weak ammonia is drawn from the lower part of the retort through the pipe 10. The ammonia-gas and permanent gases pass from the pipe 12 into the pipes 19, where, owing to the reduction in temperature due to the water surrounding the said pipes 19 and the pressure communicated from the retort 5, the ammonia-gas liquefies and sinks down into the pipe 22 and the lower folds of the pipes 19, while the permanent gases remain in the upper folds of the said pipes 19 and in the pipe 12. By now opening the valve 15 the permanent gases are allowed to escape, leaving the liquefied ammonia-gas practically free from these permanent-gas-producing impurities. The liquefied ammonia-gas, however, still contains impurities, which tend to crystallize at the low temperature in ice-machines, and thus clog the nipples of the expansion-valves, these impurities having distilled over, owing to the high temperature in the retort 5. To purify the ammonia from these impurities, the valve 23 is opened and the liquefied ammonia-gas allowed to flow into the retort 21. Owing to the lack of sufficient pressure in the retort 21 to maintain the gas in a liquefied form it distills over through the pipe 29, causing a very low temperature in the said retort 21. At the same time, preferably, a stream of cool brine is directed upon the retort through the pipe 24 to maintain the contents of the retort at a temperature of from 10° to 20° centigrade below zero. At this low temperature the carbon compounds in the ammonia are not volatile, and therefore remain behind in the lower part of the retort, from which they may be drawn off through the waste-pipe 27. The purified ammonia-gas passes down through the pipe 29, whence it may be drawn off by a pipe (not shown) and condensed to liquefied anhydrous ammonia in the ordinary way, or it may be allowed to pass through the perforations in the ring 31 into the tank 30, into which pure distilled water is admitted through the pipe 35. The contents of the tank 30 are kept cool by means of the cooling-coil 32, through which cold water is allowed to flow. As soon as the water in the tank 30 becomes saturated it may be drawn off through the pipe 37 into the shipping-drum 38 or other suitable receptacle.

Having fully described my invention, what I claim as new, and desire to secure by Letters Patent of the United States, is—

1. The process of purifying ammonia which consists in subjecting commercial water of ammonia, while under pressure to a temperature, sufficiently high, at least 180° centigrade and preferably higher to set free all of the permanent gases, which can develop from commercial ammonia under conditions prevailing in ice-machines, and removing the permanent gases, substantially as described.

2. The process of purifying ammonia, which consists in subjecting commercial water of ammonia, while under pressure to a temperature sufficiently high, at least 180° centigrade and preferably higher to set free all of the permanent gases which can develop from commercial ammonia under conditions prevailing in ice-machines, removing the permanent gases, and liquefying the resulting ammonia-gas, substantially as described.

3. The process of purifying ammonia, which consists in subjecting commercial water of ammonia, while under pressure, to a temperature, sufficiently high at least 180° centigrade and preferably higher to set free all of the permanent gases, which can develop from commercial ammonia under conditions prevailing in ice-machines, removing the permanent gases, liquefying the resulting ammonia-gas, and subjecting the liquefied ammonia-gas to distillation at a low temperature preferably at a temperature from 10° to 20° centigrade below zero, substantially as described.

In testimony whereof I have hereunto set my hand in the presence of the two subscribing witnesses.

FREDERICK W. A. FRERICHS.

Witnesses:
J. CLARENCE TAUSSIG,
W. A. ALEXANDER.